G. A. BRITT.
FRUIT DRIER.
APPLICATION FILED AUG. 21, 1914.
1,172,105.
Patented Feb. 15, 1916.
2 SHEETS—SHEET 1.
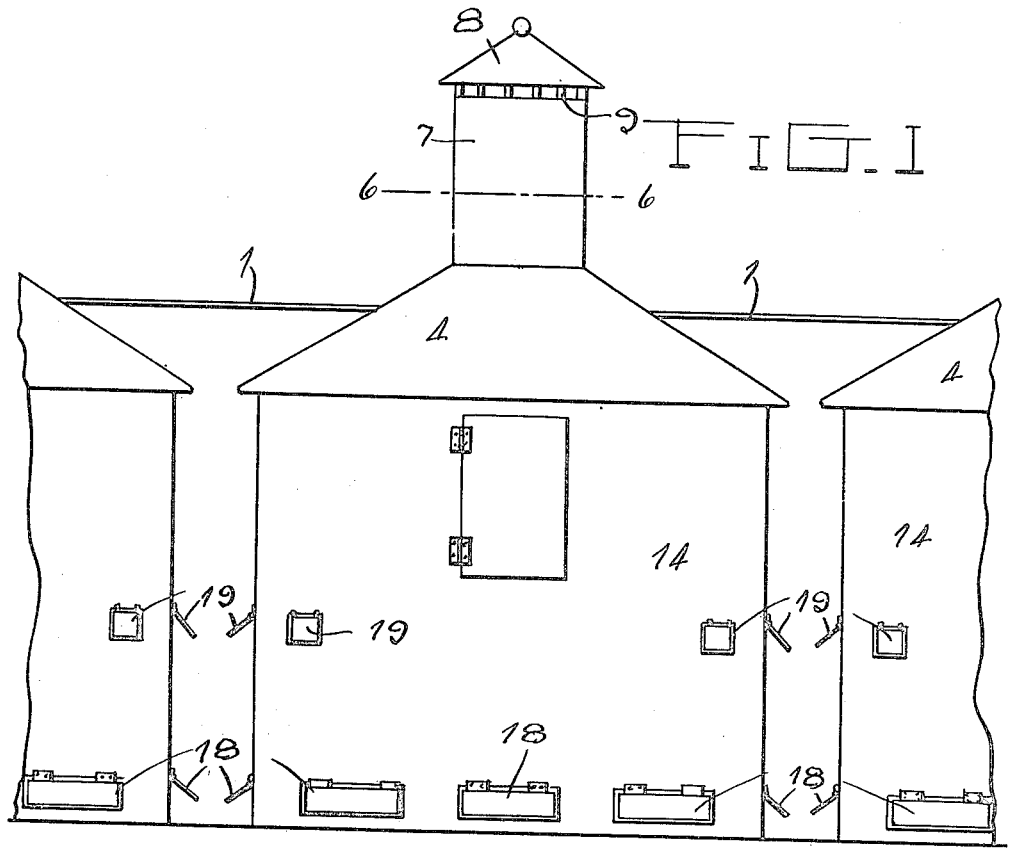
FIG. 1
FIG. 6
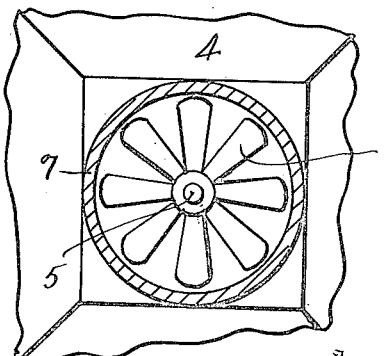
FIG. 5
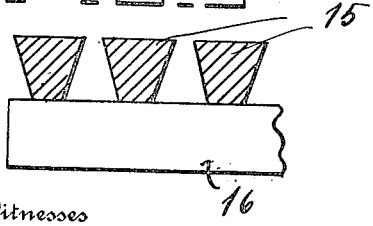
Witnesses
Chas. H. Trotter.
Wm S. Fowler.
Inventor
G. A. Britt
By
Attorney G. A. BRITT.
FRUIT DRIER.
APPLICATION FILED AUG. 21, 1914.
1,172,105.
Patented Feb. 15, 1916.
2 SHEETS—SHEET 2.
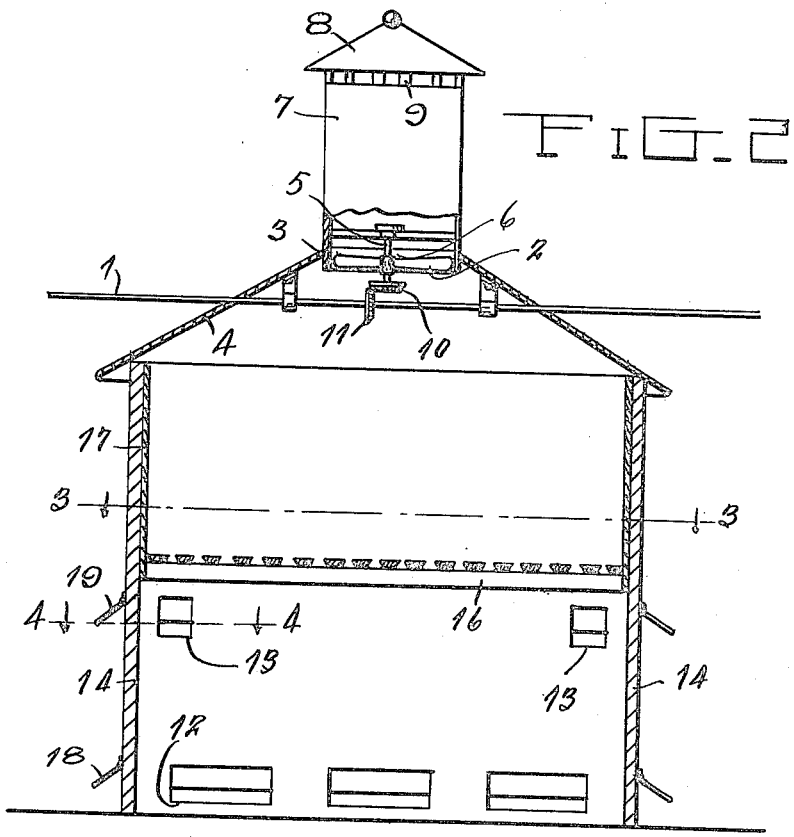
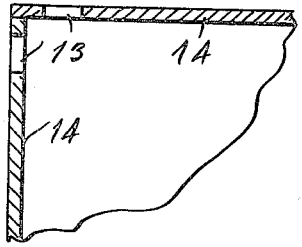
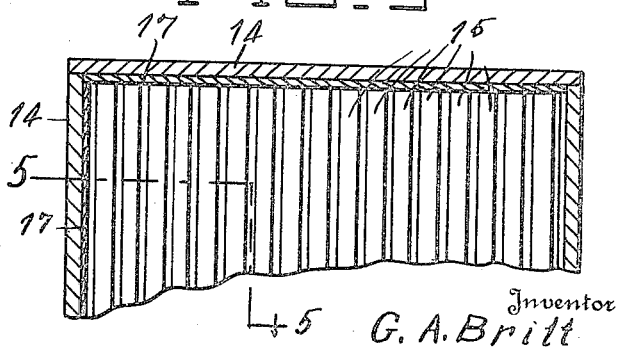
Witnesses
Chas. H. Trotter.
Wm. S. Fowler.
Inventor
G. A. Britt
By
Attorney

UNITED STATES PATENT OFFICE.

GEORGE A. BRITT, OF CENTERTON, ARKANSAS.

FRUIT-DRIER.

1,172,105.  Specification of Letters Patent.  Patented Feb. 15, 1916.

Application filed August 21, 1914. Serial No. 857,912.

*To all whom it may concern:*

Be it known that I, GEORGE A. BRITT, a citizen of the United States, residing at Centerton, in the county of Benton and State of Arkansas, have invented certain new and useful Improvements in Fruit-Driers; and I do hereby declare the following to be a full, clear, and exact description of the invention, such as will enable others skilled in the art to which it appertains to make and use the same.

This invention comprehends certain new and useful improvements in fruit driers and has for its primary object to provide a fruit drier which will be of such construction that cool fresh air may be drawn through a slotted floor to dry fruit positioned upon the same.

The invention has for a further object to provide a fruit drier in the form of a building having airtight connections between the walls and roof thereof and a slotted floor where the walls are provided with air inlet openings and doors for regulating the quantity of air entering the structure through said air inlet openings and drawn through the slotted floor by means of a suction fan positioned in the roof of the uppermost portion thereof and at the bottom of an air flue to dry fruit and the like positioned upon the slotted floor of the structure.

The invention has for a further object to generally improve and simplify the construction and operation of devices of this character and increase the efficiency thereof without materially increasing the cost of the same.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is an elevation of my improved invention, showing a complete structure and portions of adjacent structures adapted to have their suction fan operated by the same shaft, Fig. 2 is a vertical section through one of the structures, Fig. 3 is a fragmentary transverse horizontal section on the plane of line 3—3 of Fig. 2, looking in the direction indicated by the arrows, Fig. 4 is a similar view on the plane of line 4—4 of Fig. 2, looking in the direction indicated by the arrows, Fig. 5 is a detail fragmentary vertical section, taken on the plane of line 5—5 of Fig. 3, and Fig. 6 is a detail transverse horizontal section on the plane of line 6—6 of Fig. 1.

Referring in detail to the drawings by numerals, 1 designates the fan operating shaft which may extend through any number of structures to operate the fan 2 positioned in the central opening 3 in the uppermost portion of the conical roof 4 of each of said structures. It will be understood that each fan 2 is mounted upon a vertical shaft 5 rotatably mounted in a suitable bearing 6 in the lower end of an air flue 7 which extends upwardly from the center of the roof 4 of the structure, said flue 7 having a suitable deflecting cap 8 spaced above its upper end and mounted upon the suitable supporting members 9 projecting upwardly from the upper edge of said air flue 7. It will also be understood that each fan shaft 5 has a suitable beveled gear 10 mounted thereon and meshing with a suitable driving beveled gear 11 carried by the drive shaft 1.

Upon operation of the drive shaft 1 to rotate the suction fans 2, each fan will draw fresh air from around the structure into the same by way of the air inlet openings 12 positioned in the lower edges of the sides of the structure which, it will be understood is preferably of rectangular form in horizontal section and also draw air into the structure by way of the air inlet openings 13 above the air inlet openings 12 in the sides 14 of the structure and adjacent the corners of the same and also a short distance below the floor of the structure which is formed of a plurality of slats 15 positioned parallel to one another and having their opposite longitudinal edges beveled inwardly and downwardly so that the lower portions of the slats 15 are only about one-half as wide as the upper portions thereof. It will be evident that the air drawn into the structure by way of the air inlet openings 12 and 13 will be drawn upwardly through the floor between the slats 15 which are spaced suitable distances apart and positioned parallel to one another, and the air forced past the fan and out of the structure by way of the air flue 7, thereby thoroughly drying fruit and the like positioned upon the floor of the structure. It will also be understood that the slats 15 forming the floor of the structure have their opposite ends secured upon the horizontal supporting strips 16 secured against the inner faces of the sides 14 of the structure. The openings 12 positioned in the lower portion of the structure are to remain closed in the morning and at night when moisture is falling and the ground is covered with the moisture or dew, thus preventing the wet air from being drawn into the structure. As the ground is dried or the moisture rises from the same the openings 12 are opened to allow a greater amount of dry air to be drawn into the structure through the openings 12 and 13.

The structures are preferably formed of wood and the portions of the same above the floors are made airtight by linings 17 formed of cardboard or the like. It will further be understood that suitable doors 18 and 19 are provided for the air inlet openings 12 and 13 respectively, in order that said doors may be opened to any suitable distance and retained in adjusted position to properly regulate the amount of air drawn into and through the structure by means of the fan 2.

While I have shown and described the preferred embodiment of my invention, it will be understood that minor changes in the details of construction, combination and arrangement of parts may be made without departing from the spirit and scope of the invention as claimed or sacrificing any of the advantages thereof.

What is claimed is:—

A fruit drying house comprising side walls, a roof secured over the upper edges of said side walls, an air flue positioned centrally on said roof communicating with the interior thereof, a fan in the lowermost portion of said flue, means extending through the roof for rotating said fan, a floor formed of relatively spaced slats positioned within the house intermediate the ends of said side walls, the said side walls having a series of air intake openings located just below the floor, and a second series of openings located in the side walls just above the base of the structure, the second-mentioned openings being located below the first-named openings, hinged covers arranged over said openings whereby the lower openings may be closed at unfavorable times, and means for rendering the upper portion of the walls above the floor proof against the passage of air therethrough so as to cause all air passing through the fruit to be drawn up through the slat floor and the lower openings preventing air from being admitted at unfavorable times.

In testimony whereof I affix my signature in presence of two witnesses.

GEORGE A. BRITT.

Witnesses:
J. W. RAKES,
ED. H. RICH.